United States Patent [19]
Ogawa

[11] Patent Number: 6,094,405
[45] Date of Patent: Jul. 25, 2000

[54] INITIALIZATION METHOD FOR PHASE CHANGE TYPE RECORDING MEDIUM

[75] Inventor: Masatsugu Ogawa, Tokyo, Japan

[73] Assignee: NEC Corporation, Tokyo, Japan

[21] Appl. No.: 09/188,199

[22] Filed: Nov. 9, 1998

[30] Foreign Application Priority Data

Nov. 7, 1997 [JP] Japan .................................... 9-305910

[51] Int. Cl.⁷ .................................................. G11B 13/00
[52] U.S. Cl. .............................. 369/14; 427/162; 427/554
[58] Field of Search ................................ 369/14, 15, 100, 369/116, 275.2; 427/162, 554

[56] References Cited

U.S. PATENT DOCUMENTS

| | | | |
|---|---|---|---|
| 5,195,080 | 3/1993 | Komaki et al. | 369/100 |
| 5,557,599 | 9/1996 | Ohkubo | 369/116 |
| 5,646,930 | 7/1997 | Furumiya | 369/116 |
| 5,684,778 | 11/1997 | Yamada et al. | 369/100 |
| 5,768,221 | 6/1998 | Kasami et al. | 369/14 |
| 5,784,353 | 7/1998 | Matsui | 369/102 |
| 5,976,617 | 11/1999 | Hong et al. | 427/162 |

FOREIGN PATENT DOCUMENTS

| | | |
|---|---|---|
| 2-29953 | 1/1990 | Japan . |
| 4-102228 | 4/1992 | Japan . |
| 4-209317 | 7/1992 | Japan . |
| 4-366424 | 12/1992 | Japan . |
| 6-12670 | 1/1994 | Japan . |
| 7-282475 | 10/1995 | Japan . |

*Primary Examiner*—Tan Dinh
*Attorney, Agent, or Firm*—Foley & Lardner

[57] ABSTRACT

In a first step, a phase change recording film is irradiated with a laser beam at two different power levels provided alternately, one being such as to cause fusion of the phase change recording film, the other being such as to cause crystallization of the recording film. Subsequently, in a second step, the recording film is irradiated with a laser beam at a power level such as to cause crystallization of the recording film.

20 Claims, 3 Drawing Sheets

| | INITIAL RECORD | AFTER FIVE TIMES OVER-WRITING | AFTER TEN TIMES OVER-WRITING |
|---|---|---|---|
| PRESENT INVENTION | 220 | 222 | 223 |
| PRIOR ART | 200 | 213 | 220 | unit in mV

INITIALIZATION METHOD FOR PHASE CHANGE TYPE RECORDING MEDIUM

BACKGROUND OF THE INVENTION

The present invention relates to a method of initializing recording medium and, more particularly, to a method of initializing phase change recording medium for high density recording.

A material which can reversibly assume a crystal state and an amorphous (or non-crystal) state, is used for a recording film of the phase change recording medium. The phase change recording medium to be initialized is an optical recording medium, which has such a structure as to detect the difference between its reflectances in the crystal and amorphous states as a signal.

Materials usually used for phase change recording are those of chalcogenite type, e.g., GsSbTe type, InSbTe type, InSe type, InTe type, AsTeGe type, TeOx-GeSn type, TeSeSn type, SbSeBi type, BiSeGe type, AgInSbTe type, etc. These materials are used to form a film on a substrate of acrylic acid resin, polycarbonate resin, etc., thus obtaining a recording medium. Right after the manufacture of the recording medium, however, the recording material used for forming the film is entirely in the amorphous state.

The recording film in the amorphous state right after its manufacture is unstable, and also its reflectance is low. In this state of the recording film, it is difficult to obtain focus servo and track servo. To solve this problem, the recording film should be entirely initialized by carrying out an initializing process on the recording medium.

In the usual initializing method, the recording medium is irradiated with a laser beam to elevate the temperature of the phase change recording medium up to the melting temperature thereof, and then the film is crystallized by cooling for a certain period of time. This initializing process is very important in view of determining the subsequent characteristics of the phase change recording film. This is so because the characteristics of the recording film greatly vary in dependence on the way of initialization.

Heretofore, the phase change recording film is initialized by irradiating it with a laser beam at a certain fixed power level. It is well known in the art that the crystal state of the phase change recording film that is obtained in this method, is slightly different from the crystal state obtained in case of carrying out recording and erasing on an actual recording medium reproducing apparatus. This is so because the phase change recording film obtained after the actual recording and erasing is a result of repeated heating and cooling.

FIG. 4 is a view showing a relationship between the power level of the laser beam used in the prior art recording medium initialization method and time. As is seen from the Figure, the laser beam power level is fixed. The laser beam irradiation is made by using an apparatus as shown in FIG. 5. The same apparatus is also used for data reproduction. As shown, in the apparatus a recording medium which is in the form of a disc is initialized continuously by causing movement of the laser beam from its inner periphery toward its outer periphery or vice versa while causing its rotation.

As shown above, where the phase change recording medium is different in the crystal state right after its initialization and after carrying out the recording and erasing several times, its optical characteristics are also different in these different states. That is, in this case the recording medium is different in the optical characteristics right after the initialization and after carrying out over-writing (i.e., recording and erasing) several tens of times.

Some attempts for providing improvement in this connection have been proposed. For example, Japanese Patent Laid-Open Publication No. 4-366424 shows a method, in which a phase change recording film is irradiated with a laser beam of a certain fixed power level to make portions of the film irradiated with the laser beam spot to be in a crystal state. The position of the laser beam spot on the recording medium is gradually shifted. In this way, the recording film is initialized. This initialization is carried out such that fused crystals having relatively large crystal grain sizes are left.

The fused crystals are in a crystal state close to the state obtainable by recording and erasing data with the actual recording medium reproducing apparatus, thus solving the above problem. In this method, however, only part of the laser beam spot is used for the initialization of the phase change recording film. Therefore, the method has a drawback that it takes a very long time to initialize the entire recording medium.

Japanese Patent Laid-Open Publication No. 6-12670 shows a different initializing method, which uses an irradiating laser beam with the power level thereof in a pulse form. In this prior art initializing method, however, the initialization can be made only track by track, and therefore requires a great deal of time. Besides, this method requires formation of a reference signal in the phase change recording film of the recording medium. In other words, the method requires a preamble requirement, and is therefore very limitative.

Japanese Patent Laid-Open Publication No. 4-102228 proposes a further initializing method, which again uses an irradiating laser beam with the power level thereof in a pulse form. This method has an aim of facilitating the focus servo and track servo as described below. As described above, while a recording medium right after the initialization is usually entirely in a crystal state, the reflection intensity in this state is different from the mean reflection intensity in case when signal is recorded with an actual recording medium reproducing apparatus.

As described before, this phenomenon results in some load on the focus servo and track servo. In the proposed initializing method, record marks which are equivalent to recording signal, are preliminarily written on the recording medium to eliminate the difference of the reflection intensity from the mean reflection intensity in the case when signal is recorded with the actual recording medium reproducing apparatus, thus providing satisfactory focus servo and track servo functions.

In order to obtain these effects, however, the initialization should be made track by track. Again this initializing method, therefore, requires a great deal of time. Besides, this method does not adopt a process of repeatedly irradiating the recording medium at the same position thereof with a laser beam pulse by causing several rotations of the recording medium. Therefore, the method cannot improve the phenomenon that the crystal state right after the initialization is different from that after several tens of times of over-writing with the actual recording medium reproducing apparatus.

SUMMARY OF THE INVENTION

An object of the present invention is to provide a method of initializing a recording medium, which can overcome the drawbacks discussed above, inherent in the prior art, particularly permitting that the crystal state of a phase change recording medium right after the initialization is just like the crystal state obtainable after several tens of times of recording and erasing.

According to the present invention, there is provided a method of initializing a recording medium comprising steps of:

irradiating a phase change recording film with a laser beam at two different power levels provided alternately, one being such as to cause fusion of the phase change recording film, the other being such as to cause crystallization of the phase change recording film; and subsequently irradiating the phase change recording film with a laser beam at a power level such as to cause crystallization of the phase change recording film.

The step of irradiation with the laser beam at the two different power levels is carried out a plurality of times. The dimension of the spot of the laser beam on the recording medium in the radial direction thereof covers a plurality of tracks. The spot of the laser beam is shifted by a distance equal to one half the laser beam spot dimension in the radial direction of the recording medium for each rotation of the recording medium. The laser beam power level change cycle in the step of irradiation with the laser beam at the two different power levels is set to 100 ns to 1 μs.

The irradiating laser beam is a pulse beam. The laser beam irradiation at the power level P1 is made subsequent to the initialization with the laser beam irradiation at the alternate power levels P1 and P2. The laser beam is an elliptic spot or a circular spot.

The recording medium comprises a substrate, a dielectric film formed on the substrate, a phase change recording film formed on the dielectric film and a dielectric film formed on the phase change recording film. The substrate is usually made of such material as acrylic acid resin, polycarbonate resin, epoxy resin, styrene resin and glass, and is disc- or card-like in form. The substrate is coated with a resin. The phase change recording film is made of a material which can be reversibly made to be in a crystal state and an amorphous state. The phase change recording film is formed by using a phase change material of charcogenite type, e.g., GeSbTe type, InSbTe type, InSe type, InTe type, AsTeGe type, TeOx-GeSn type, TeSeSn type, SbSeBi type, BeSeGe type, AgInSbTe type. The method of initializing a recording medium further comprising a predetermined reflecting film on the dielectric film on the phase change recording film. The reflecting film is formed by using material of Al or AlTi.

By irradiating the phase change recording film with the laser beam at two different power levels provided alternately, one being such as to cause fusion of the phase change recording film, the other being such as to cause crystallization of the phase change recording film, it is possible to make the recording film to be in a crystal state, which is just like what is obtainable by recording and erasing data in the recording film. Thus obtained recording medium provides a stable characteristic from the initial time.

Other objects and features will be clarified from the following description with reference to attached drawings.

PREFERRED EMBODIMENTS OF THE INVENTION

Preferred embodiments of the present invention will now be described with reference to the drawings.

Figures 2, 3:
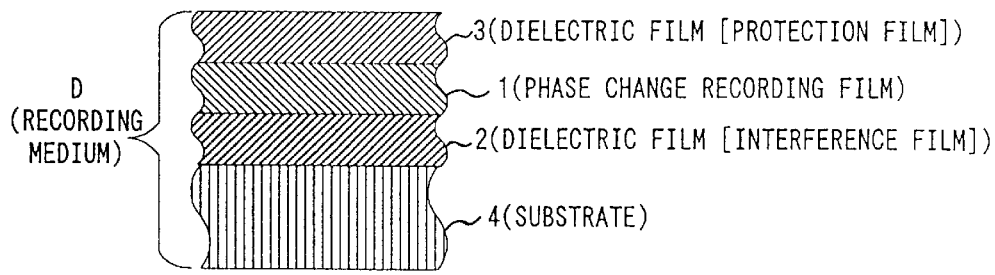
FIG. 2 shows a basic structure of the phase change recording medium D used in the embodiment according to the present invention.
FIG. 3 shows a graph for explaining characteristic of the recording medium initialized according to the present invention.
Figure 4:
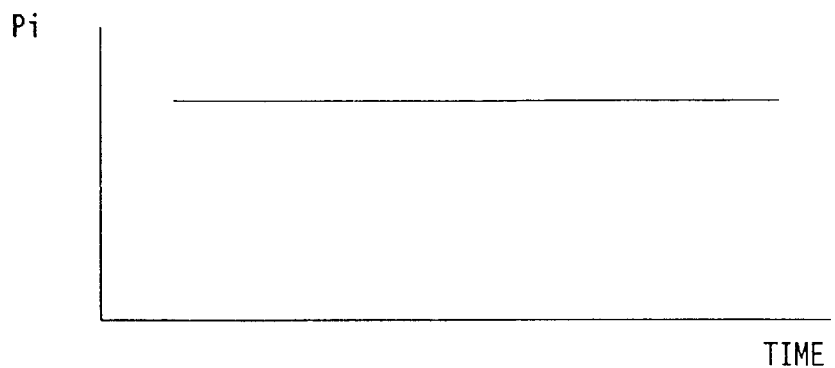
FIG. 4 is a view showing a relationship between the power level of the laser beam used in the prior art recording medium initialization method and time.

FIG. 2 shows the basic structure of the phase change recording medium D used in the embodiment. As shown, the recording medium D comprises a substrate 4, a dielectric film 2 formed thereon, and a phase change recording film 1 formed on the dielectric film 2. A dielectric film 3 is further formed on the phase change recording film 1. The substrate 4 is usually made of such material as acrylic acid resin, polycarbonate resin, epoxy resin, styrene resin and glass, and is disc- or card-like in form. The substrate 4 may be coated with a resin or the like.

The phase change recording film 1 is made of a material which can be reversibly made to be in a fused state and an amorphous state. Specifically, the phase change recording film 1 is formed by using a phase change material of charcogenite type, e.g., GeSbTe type, InSbTe type, InSe type, InTe type, AsTeGe type, TeOx-GeSn type, TeSeSn type, SbSeBi type, BeSeGe type, AgInSbTe type, etc. The phase change recording film 1 may be formed by vacuum deposition or sputtering. These methods, however, are by no means limitative.

While the structure shown in FIG. 2 has only the two dielectric films 2 and 3 and the phase change recording film 1 formed on the substrate 1, it is possible to form a predetermined reflecting film or the like on the dielectric film 3 on the phase change recording film 1 (i.e., the dielectric film remotest from the substrate 4), Such a reflecting film is suitably formed by using such a material as Al and AlTi.

Figure 1A:
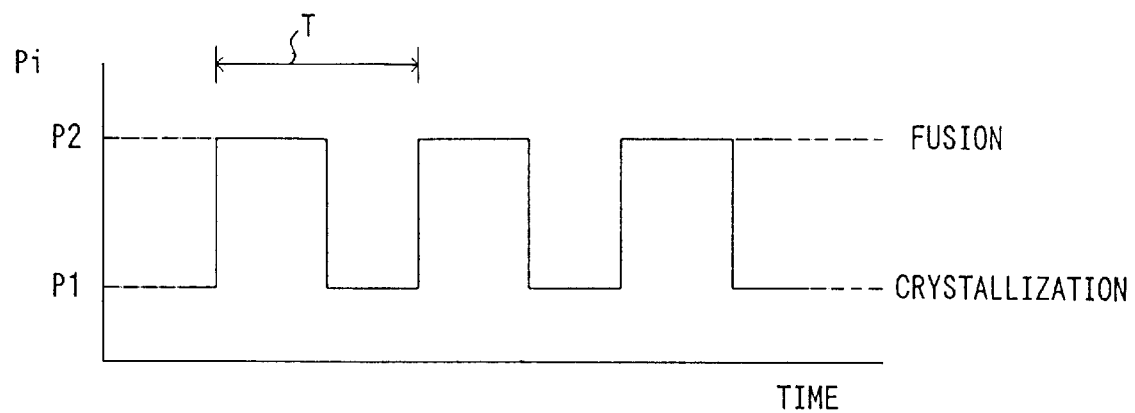
FIGS. 1(a) and 1(b) show power levels of laser beam for cases of alternative level changes of P1 and P2 and lastly crystallization.

As shown in FIG. 1(a), the irradiating laser beam is a pulse beam, having alternate levels P1 and P2. At the power level P1, the phase change recording film 1 is brought to its crystallizing temperature. At the power level P2, the recording film 1 is brought to its fusing temperature. By irradiating the recording film 1 with such a pulse laser beam, a crystal state is obtained, which is close to a state obtainable by recording and erasing data in the recording film 1 with an actual recording medium reproducing apparatus. Thus, except for the neighborhood of its portion irradiated with the beam at the level P2, the phase change recording film 1 is in a state, which is just like the crystal state obtained after several ten times of over-writing with the actual recording medium reproducing apparatus.

This means that with an arrangement to let the same portion of the phase change recording film 1 be irradiated at the power levels P1 and P2 at least once, the phase change recording film 1 can be brought to a desired crystal state except for the neighborhood of a portion irradiated at the power level P2 right before. This means that psuedo-repetition of heating and cooling several times makes the crystal state of the phase change recording film 1 to be different from the crystal state right after manufacture of the recording medium D.

Figure 1B:
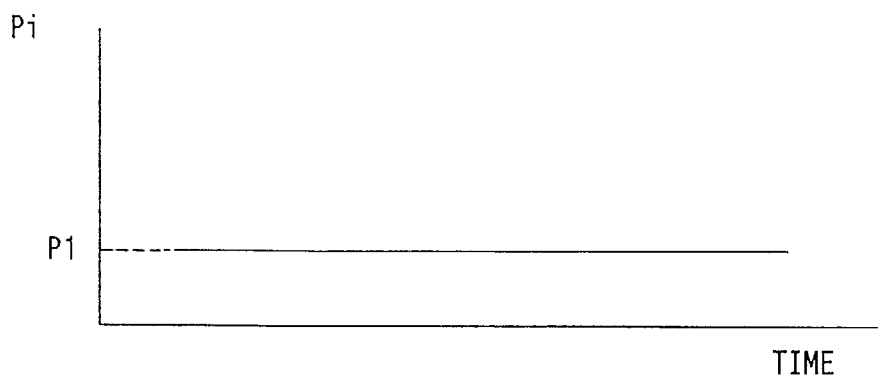

The recording medium D may be used even in this state. However, by making subsequent irradiation of a pulse laser beam at the sole power level P1, as shown in FIG. 1(b), the following advantageous effect is obtainable. By making continual initialization with laser beam irradiation at the sole power level P1 subsequent to the initialization with the laser beam irradiation at the alternate power levels P1 and P2, the amorphous portion of the phase change recording film 1, irradiated at the power level P2 right before, can also be made to be the optimum crystal state for recording data.

The laser beam used for initialization this embodiment produces an elliptic spot, which is longer in the radial direction of the disc-like recording medium D and shorter in the tangential direction thereto. The elliptic laser beam spot is by no means limitative, and it is possible to use a circular spot as well.

According to the present invention it is possible to use a laser beam spot having a diameter of about 100 times the track width, thus permitting great reduction of the time required for initialization. It is thus possible to permit quickly carrying out the operation of providing a similar crystal state after initialization to the crystal state obtainable after several tens of times of actual over-writing.

This is important from the standpoint of the design of the recording medium reproducing apparatus. In other words, the recording medium reproducing apparatus can use a recording medium D, which has a stable performance independent of the number of times of recording (i.e., recording and erasing), and it is possible to preclude the problem of extreme performance deterioration as a result of carrying out a certain number of times of recording and erasing.

A specific example will now be described. As the substrate 4 is used a polycarbonate substrate with a diameter of 120 mm, a track pitch of 0.56 $\mu$m and a thickness of 0.6 mm. As the dielectric film (interference film) 2, a ZnS-SiO$_2$ of film 160 nm thick was formed on the substrate 4. As the phase change recording film 1 was formed a Ge$_2$Sb$_2$Te$_5$ film of 10 nm thick, and as the dielectric film (Protective film) 3 was formed a ZnS-SiO$_2$ film of 32 nm thick. In this example, an AiTi film of 80 nm thick was further formed on the dielectric film 3.

Figure 5:
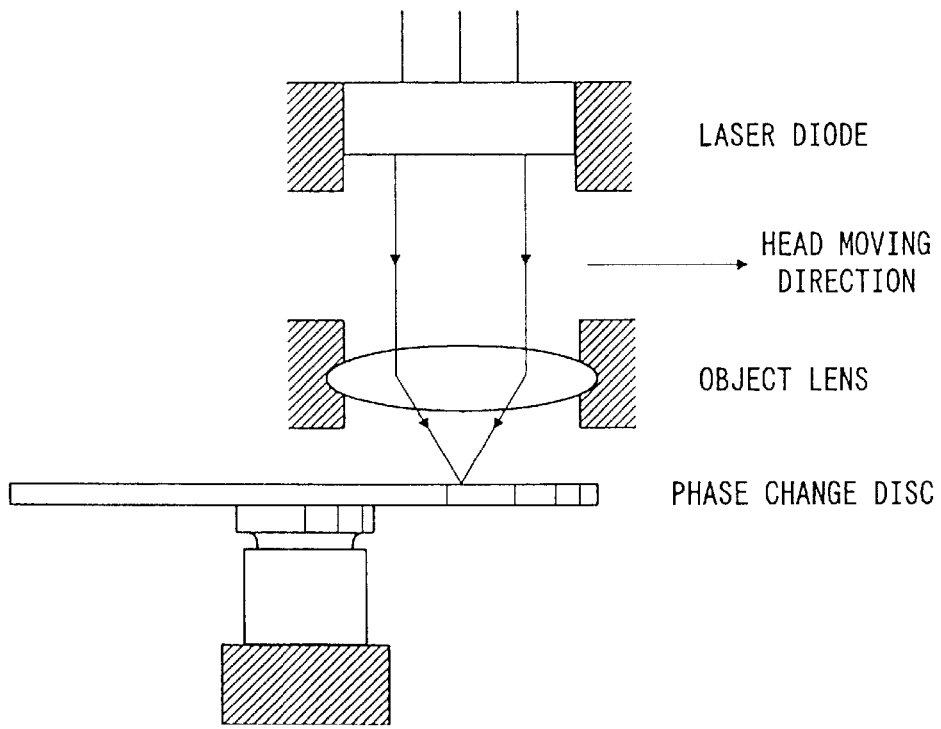
FIG. 5 shows a construction foe explaining the prior initialization apparatus.

The same initializing apparatus as the prior art one shown in FIG. 5 was used. That is, the recording medium D rotated by the spindle motor was provided with focus servo, and is entirely initialized by laser beam irradiation with the laser beam spot shifted in the radial direction of the recording medium D for every rotation thereof.

Spot dimensions of the laser beam of the initializing apparatus were about 2 $\mu$m in the tangential direction to the recording medium D, and about 100 $\mu$m in the radial direction thereof. The linear speed of the disc was set to about 7.5 m/s at each radial position. More specifically, the spindle motor rotation number was set to a large value for initializing the inner periphery side of the recording medium D and to a small value for initializing the outer periphery side thereof. The rate of the radial shift of the laser beam spot was set to about 50 $\mu$m (one half the long dimension of the laser beam spot) per rotation of the recording medium D. Laser beam irradiation was caused at least twice at particular positions of the recording medium D.

The phase change recording medium D produced this time was initialized using an irradiating laser beam at power levels P1 and P2 of 380 and 600 mW, respectively. The power level change cycle was set to be in a range of 100 ns to 1 $\mu$s. This was done so because this range is close to the cycle when actually writing data and permits an adequate crystal state to be obtained after initialization. The recording medium D was initialized by irradiating its entire surface with a pulse laser beam at the power levels P1 and P2 three times. The irradiation with such a pulse laser beam at the power levels P1 and P2 a plurality of times means irradiation of a particular portion of the phase change recording film with this laser beam a plurality of times. It is thus possible to obtain a crystal structure similar to that of the recording medium D after a plurality of times of recording and erasing. Subsequently, the entire surface of the recording medium D was irradiated for initialization with a fixed power laser beam at the power level P1.

In this embodiment, the recording medium D was initialized by laser beam irradiation of its entire surface a plurality of times, and it is possible to increase the amount of the laser beam spot shift per rotation of the recording medium D to 50 $\mu$m. It is thus possible to obtain initialization about 10 times as quickly as the prior art initializing method by causing track-by-track laser beam spot shift.

A specific initializing method will now be described. In this method, the recording medium D is initialized from the outer periphery side thereof. First, the laser beam spot is positioned on the recording medium D on the outer periphery side thereof. Then, the recording medium D is rotated at a predetermined rpm. The irradiating laser beam alternately has power level P1 for causing crystallization of the phase change recording medium 1 and power level P2 for causing fusion thereof. With the rotation of the recording medium D, a crystallized and an amorphous state marks appear alternately on the recording track.

When the recording medium D completes one rotation, the laser beam spot is shifted in the radial direction of the recording medium D. When the shift amount at this time is set to about one half the laser beam spot diameter, particular positions of the recording medium D are irradiated once again with the laser beam with the alternate power levels. Thus, the marks formed in the preceding rotation are overwritten. However, since the laser beam spot position is not synchronized for every rotation, the marks formed in the rotation of this time are deviated from the mark formed in the preceding rotation.

Thus, particular positions of the recording medium D are irradiated with the fusing and crystallizing power levels each once in one initializing cycle (from the outer to the inner periphery side). With such random pulse laser beam irradiation, it is possible to obtain the same effect as obtainable by irradiation at the alternate fusing and crystallizing power levels. Subsequently, irradiation with a laser beam at the crystallizing power level is made to bring an end to the initialization.

FIG. 3 shows maximum levels in mV of an initial recorded signal and a reproduced signal when over-writing is made once, five times and ten times after initialization of the recording medium D according to the prior art initializing method and the present invention. The maximum level is proportional to the intensity of reflected light from the crystal of the recording medium D. In this experiment, the reflected light intensity is not substantially changed with the experiment conditions.

In contrast, with the recording medium D initialized in the prior art method, the reflected light intensity changed greatly with the number of times of recording. In the initialization, the entire surface of the recording medium D was initialized once using a laser beam with a power level of 430 mW. As shown in FIG. 3, the level of the reflected signal is increased with increasing number of times of recording and erasing.

As has been described in the foregoing, according to the present invention, as set forth in claim 1, a phase change recording film is irradiated with a laser beam at two different power levels provided alternately, one being such as to cause fusion of the phase change recording film, the other being such as to cause crystallization of the recording film, and is subsequently irradiated with a laser beam at a power level such as to cause crystallization of the recording film. Thus, it is possible to obtain substantially the same crystal state as obtainable after recording and erasing data. The method thus has an excellent effect that the recording medium initialized according to this method exhibits stable performance from the outset.

According to the present invention, as set forth in claim 2, the step of irradiation with the laser beam at the two different power levels is carried out a plurality of times. The method thus has an excellent effect that the entire recording medium is uniformly initialized.

According to the present invention, as set forth in claim 3, the dimension of the spot of the laser beam on the recording medium in the radial direction thereof covers a plurality of tracks. The method thus has an excellent effect that a plurality of tracks can be initialized at a time with single laser beam irradiation.

According to the present invention, as set forth in claim 4, the spot of the laser beam is shifted by a distance equal to one half the laser beam spot dimension in the radial direction of the recording medium for each rotation of the recording medium. Thus, in one initializing cycle at least particular positions of the recording medium are irradiated with the laser beam at least twice. The method thus has an excellent effect of improving the possibility that irradiation at different laser beam power levels.

According to the present invention, as set forth in claim 5, the laser beam power level change cycle in the step of irradiation with the laser beam at the two different levels is set to 100 ns to 1 µs. This cycle is equal to the cycle when data is actually recorded. The method thus has an effect that it is possible to produce substantially the same crystal state of the recording medium as obtainable when recording and erasing are made in actual use.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. A method of initializing a recording medium comprising steps of:
   irradiating a phase change recording film with a laser beam at two different power levels provided alternately, one being at a first level that causes fusion of the phase change recording film, the other being at a second level that causes crystallization of the phase change recording film; and
   subsequently irradiating the phase change recording film with a laser beam at a power level that causes crystallization of the phase change recording film.

2. The method of initializing a recording medium according to claim 1, wherein the step of irradiating with the laser beam at the two different power levels is carried out a plurality of times.

3. The method of initializing a recording medium according to claim 1, wherein the dimension of the spot of the laser beam on the recording medium in the radial direction thereof covers a plurality of tracks.

4. The method of initializing a recording medium according to claim 3, wherein the spot of the laser beam is shifted by a distance equal to one half the laser beam spot dimension in the radial direction of the recording medium for each rotation of the recording medium.

5. The method of initializing a recording medium according to claim 1, wherein the laser beam power level change cycle in the step of irradiating with the laser beam at the two different power levels is set to 100 ns to 1 µs.

6. The method of initializing a recording medium according to claim 1, wherein the irradiating laser beam is a pulse beam.

7. The method of initializing a recording medium according to claim 1, wherein the step of subsequently irradiating is carried out at the second power level.

8. The method of initializing a recording medium according to claim 1, wherein the laser beam is an elliptic spot or a circular spot.

9. The method of initializing a recording medium according to claim 1, wherein the recording medium comprises a substrate, a dielectric film formed on the substrate, a phase change recording film formed on the dielectric film and a dielectric film formed on the phase change recording film.

10. The method of initializing a recording medium according to claim 9, wherein the substrate comprises one of acrylic acid resin, polycarbonate resin, epoxy resin, styrene resin and glass, and is disc-shaped or card-shaped.

11. The method of initializing a recording medium according to claim 10, wherein the substrate is coated with a resin.

12. The method of initializing a recording medium according to claim 9, wherein the phase change recording film is made of a material having a crystal state and or an amorphous state.

13. The method of initializing a recording medium according to claim 12, wherein the phase change recording film is formed by using a phase change material comprising one of GeSbTe, InSbTe, InSe, InTe, AsTeGe, TeOx-GeSn, TeSeSn, SbSeBi, BeSeGe, and AgInSbTe.

14. The method of initializing a recording medium according to claim 9, further comprising a predetermined reflecting film on the dielectric film on the phase change recording film.

15. The method of initializing a recording medium according to claim 14, wherein the reflecting film is formed by using material of Al or AlTi.

16. A method of initializing a recording medium comprising the steps of:
   irradiating the recording medium with a pulsed laser beam alternating between a first power level that causes fusion of the recording medium and a second power level that causes crystallization of the recording medium; and
   subsequently irradiating the recording medium with a laser beam of a fixed power level that causes crystallization of the recording medium.

17. The method of initializing a recording medium according to claim 16, wherein the step of irradiating with the pulsed laser beam includes the step of rotating the recording medium.

18. The method of initializing a recording medium according to claim 17, wherein the spot of the pulsed laser beam on the recording medium is shifted by a distance equal to less than the size of the laser beam spot in the radial direction of the recording medium for each rotation of the recording medium.

19. The method of initializing according medium according to claim 18, wherein the spot of the pulsed laser beam on the recording medium is shifted by a distance equal to half the size of the laser beam spot in the radial direction of the recording medium for each rotation of the recording medium.

20. The method of initializing a recording medium according to claim 16, wherein the fixed power level is the same level as the second power level.

* * * * *